United States Patent
Inoue

(10) Patent No.: US 8,038,303 B2
(45) Date of Patent: Oct. 18, 2011

(54) PROJECTION APPARATUS AND OPTICAL RANGING METHOD

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 386 days.

(21) Appl. No.: 12/208,499

(22) Filed: Sep. 11, 2008

(65) Prior Publication Data
US 2009/0073323 A1  Mar. 19, 2009

(30) Foreign Application Priority Data
Sep. 13, 2007  (JP) .................................. 2007-237501

(51) Int. Cl.
G03B 21/00 (2006.01)
G03B 21/14 (2006.01)
G03B 3/00 (2006.01)
H04N 3/26 (2006.01)
H04N 3/23 (2006.01)
H04N 3/223 (2006.01)
H04N 3/227 (2006.01)

(52) U.S. Cl. ........... 353/70; 353/101; 348/746; 348/747

(58) Field of Classification Search .................... 353/70, 353/69, 101; 348/745–747
See application file for complete search history.

(56) References Cited

U.S. PATENT DOCUMENTS

| | | | |
|---|---|---|---|
| 6,310,662 B1 | 10/2001 | Sunakawa et al. | |
| 6,520,647 B2 * | 2/2003 | Raskar | 353/70 |
| 7,131,732 B2 * | 11/2006 | Inoue | 353/70 |
| 7,204,596 B2 * | 4/2007 | Tamura | 353/70 |
| 2005/0001986 A1 * | 1/2005 | Matsuda | 353/31 |
| 2005/0062939 A1 | 3/2005 | Tamura | |
| 2005/0190343 A1 | 9/2005 | Kuwabara et al. | |
| 2005/0237492 A1 * | 10/2005 | Shinozaki | 353/69 |

FOREIGN PATENT DOCUMENTS

| | | |
|---|---|---|
| EP | 0 689 353 A2 | 12/1995 |
| EP | 1 517 550 A2 | 3/2005 |
| EP | 1 569 447 A1 | 8/2005 |

(Continued)

OTHER PUBLICATIONS

International Search Report dated Dec. 23, 2008 in connection to Application No. PCT/JP2008/066494.
Written Opinion of the International Searching Authority dated Dec. 23, 2008 in connection to Application No. PCT/JP2008/066494.

(Continued)

Primary Examiner — Georgia Epps
Assistant Examiner — Magda Cruz
(74) Attorney, Agent, or Firm — Holtz, Holtz, Goodman & Chick, PC

(57) ABSTRACT

Disclosed is a projection apparatus including: a video display control section 53 to project and display a video according to input video data; and a projection distance obtainment section 14 to irradiate to a projection plane where the video is projected with a laser and displayed by the video display control section 53, and to obtain a projection distance to the projection plane, wherein when the projection distance is obtained by the projection distance obtainment section 14, the video display control section 53 adjusts a display status of at least a first video area 66 corresponding to a laser ranging point 63 which is an area where the laser is irradiated to a display status for obtaining the projection distance so that the distance from the projection apparatus to the projection plane can be measured fast and with high accuracy.

11 Claims, 21 Drawing Sheets

FOREIGN PATENT DOCUMENTS

| | | |
|---|---|---|
| JP | 07-084045 A | 3/1995 |
| JP | 08-009309 A | 1/1996 |
| JP | 2001-285691 A | 10/2001 |
| JP | 2002-176539 A | 6/2002 |
| JP | 2005-039558 A | 2/2005 |
| JP | 2005-165206 A | 6/2005 |

OTHER PUBLICATIONS

Japanese Office Action dated Aug. 17, 2010 (and English translation thereof) in counterpart Japanese Application No. 2007-237501.

Korean Office Action dated Sep. 29, 2010 (and English translation thereof) in counterpart Korean Application No. 10-2009-7009651.

* cited by examiner

FIG. 7
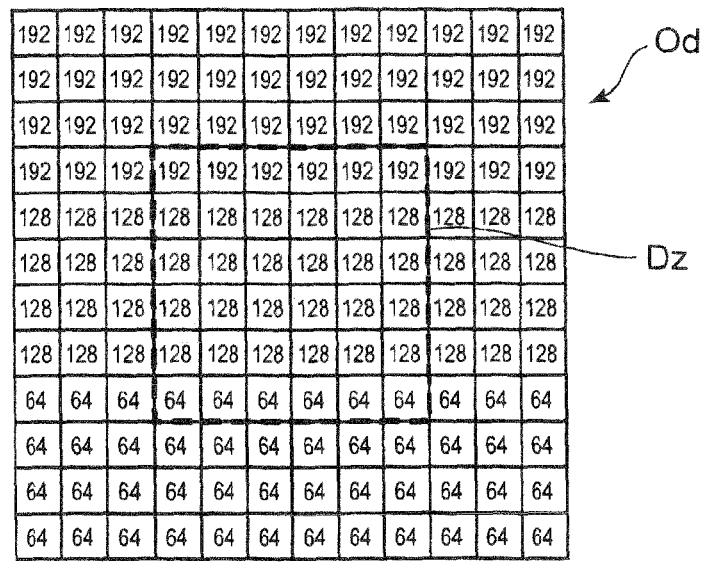
CLIPPING
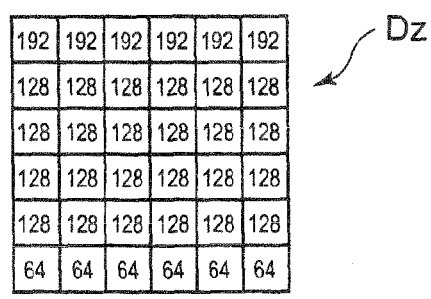
PIXEL COMPLEMENT
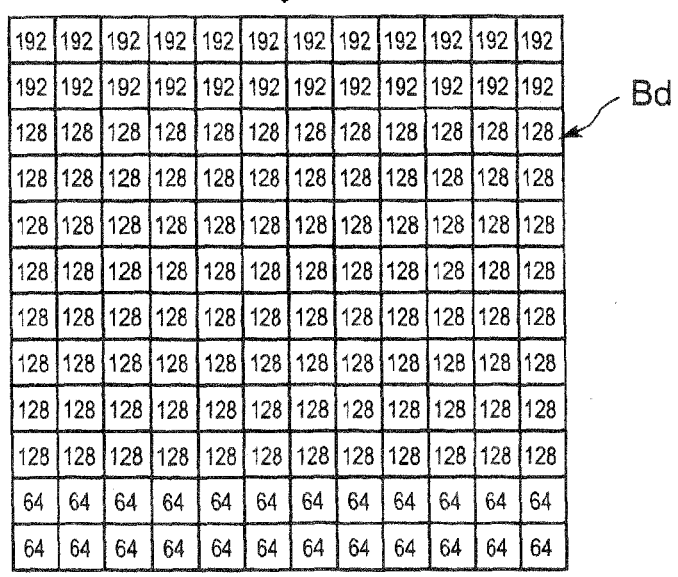

ADJUSTMENT DATA OF
FIRST EMBODIMENT

ADJUSTMENT DATA OF
SECOND EMBODIMENT

ADJUSTMENT DATA OF
FIRST EMBODIMENT

ADJUSTMENT DATA OF
SECOND EMBODIMENT

ADJUSTMENT DATA OF
FIRST EMBODIMENT

ADJUSTMENT DATA OF
SECOND EMBODIMENT

PROJECTION APPARATUS AND OPTICAL RANGING METHOD

BACKGROUND OF THE INVENTION

1. Field of the Invention

The present invention relates to a projection apparatus and optical ranging method.

2. Description of the Related Art

Today, a data projector as a projection apparatus for projecting onto a screen an image displayed on a screen of a personal computer, image of a video signal, image from image data stored in a memory card etc., and the like is heavily used.

A projection apparatus often uses a light source which is compact with high intensity, such as a metal halide lamp or extra high pressure mercury lamp, and light output from the light source is irradiated to a display element called liquid crystal or digital micromirror device (DMD) by the optical system of the light source as three primary colors through a color filter to project the transmitted light or reflected light of the display element onto the screen through a group of lenses which are to be the optical system of the projector including a zoom function.

In such a projection apparatus, when a projection plane is in a slanted position to a plane perpendicular to an optical axis of a projected light emitted from the projection apparatus, trapezoidal distortion of the projected video occurs. For example, Japanese Patent Application Laid-Open Publication No. 2005-39558 proposes a technique of measuring a distance from a plurality of points on the projection plane to the projection apparatus with a ranging sensor acting on a phase difference method in order to obtain a relationship of a relative position between the projection apparatus and the projection plane, and based on the result, correcting the trapezoidal distortion in the projected image by image processing without physically adjusting the relationship of the relative position between the projection apparatus and the projection plane.

Japanese Patent Application Laid-Open Publication No. H7-84045 proposes a technique of measuring using a ranging sensor acting on a laser method instead of a ranging sensor acting on a phase difference method, and merits of this technique is that compared to the phase difference method, the ranging speed is faster, the ranging accuracy is higher, etc.

However, in ranging to the projection plane with a laser method performed by a projection apparatus, there is a problem of when an image with a color element having a same wavelength as the laser beam is projected on the projection plane, the influence of the reflected light of the image itself causes reduction of the ranging accuracy.

An object of the present invention is to provide a projection apparatus and an optical ranging method which can measure a distance from a projection apparatus to a projection plane fast and highly accurately.

SUMMARY OF THE INVENTION

The present invention has been made in consideration of the above situation, and has an advantage of measuring a distance from a projection apparatus to a projection plane fast and highly accurately.

In order to achieve any one of the above advantages, according to a first aspect of the present invention, there is provided a projection apparatus comprising:

a video display control section to project and display a video according to input video data; and a projection distance obtainment section to irradiate a projection plane with light where the video is projected and displayed by the video display control section, and to obtain a projection distance to the projection plane, wherein when the projection distance is obtained by the projection distance obtainment section, the video display control section adjusts a display status of at least a predetermined video area corresponding to an area irradiated with the light to a display status for obtaining the projection distance.

According to a second aspect of the present invention, there is provided an optical ranging method comprising:

video display controlling step to project and display a video according to input video data; and projection distance obtaining step to irradiate a projection plane with light where the video is projected and displayed by the video display controlling step, and to obtain a projection distance to the projection plane, wherein the video display controlling step, when the projection distance is obtained in the projection distance obtaining step, includes adjusting a display status of at least a predetermined video area corresponding to an area irradiated with the light to a display status for obtaining the projection distance.

BRIEF DESCRIPTION OF THE DRAWINGS

The present invention and the above-described objects, features and advantages thereof will become more fully understood from the following detailed description with the accompanying drawings and wherein;

FIG. 7 is an explanatory diagram showing digital zoom;

FIG. 18 is an explanatory diagram showing adjustment of video data;

FIG. 20A and FIG. 20B are explanatory diagrams showing adjustment data;

DETAILED DESCRIPTION OF THE PREFERRED EMBODIMENTS

A best mode for carrying out the present invention will be described below with reference to the attached drawings. The embodiments described below include various technically preferable limitations for carrying out the present invention, however, the scope of the invention is not limited to the embodiments described below and the illustrated examples.

First Embodiment

The first embodiment when a projection apparatus of the present invention is implemented in a projector 1 will be described with reference to the drawings. In the first embodiment, obtaining a projection distance from a projection plane, where a video is projected by the projector 1, to the projector 1 and focus adjustment of a projected video based on the obtained projection distance will be described.

Figure 1:
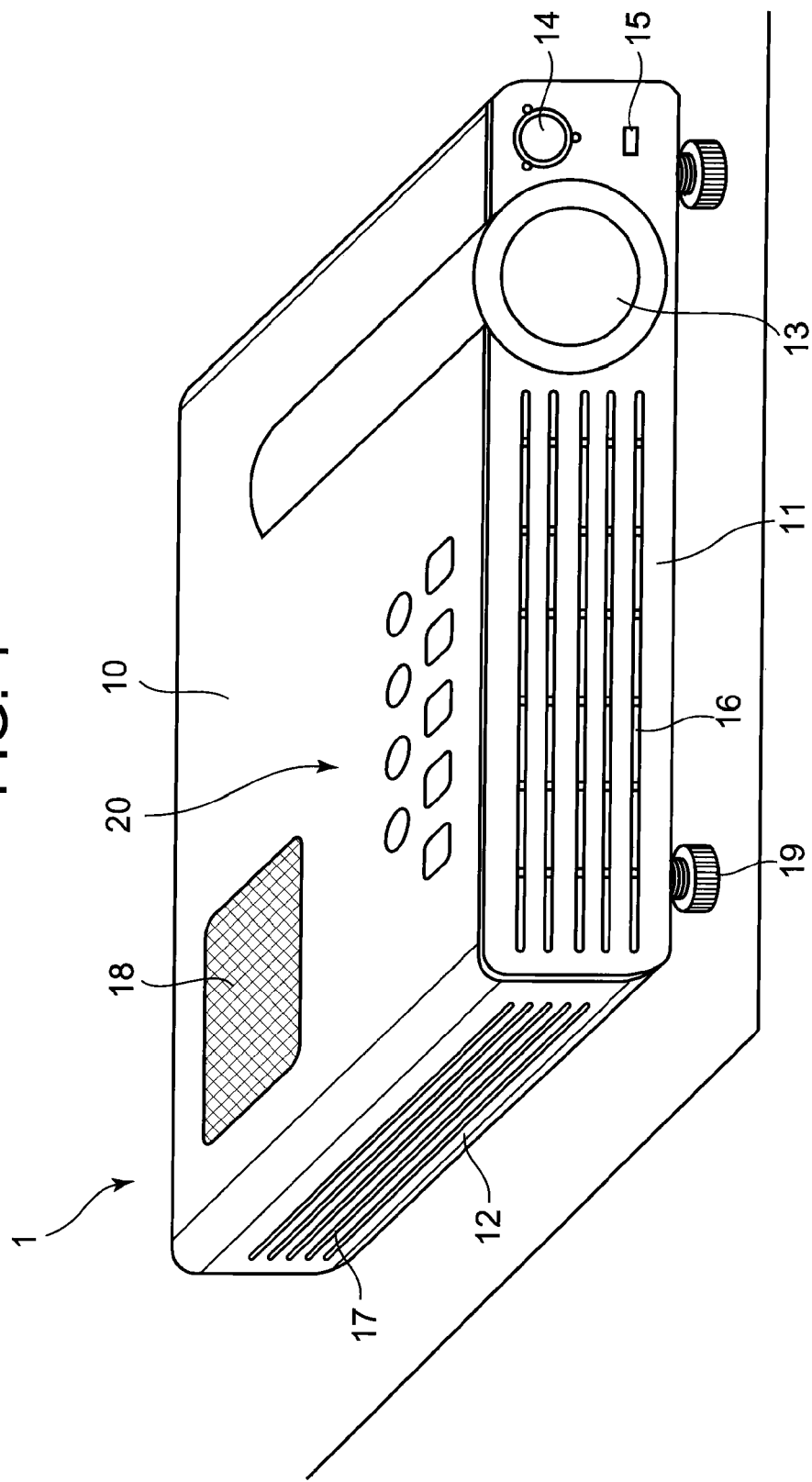
FIG. 1 is an explanatory diagram showing an outer structure of a projector.

FIG. 1 is a diagram showing an outer structure of the projector 1.

The projector 1 includes a body case 10 and 11 which is a box provided with operation blocks such as a key input/indicator section 20 for external operation, an audio output section 18, a projection section 13 for projecting a video, a projection distance obtainment section 14 for obtaining a projection distance to the projection plane by irradiating to the projection plane with a pulsed laser, an Ir reception section 15 for receiving a control signal from a remote controller, and the like. A plurality of air intake holes 17 and air exhaust holes 16 are formed on a side and front of the box for introducing external air to cool the inside of the box. Front legs 19 with an extension function are provided on a bottom of the box to enable manual adjustment of a projection angle. An input connector section 21 including a D-SUB terminal, S terminal, or RCA terminal for input of external video data, and although not shown, a USB terminal, a power supply adapter plug, a memory card slot and the like are provided on a back of the box.

The key input/indicator section 20 is configured with a power switch key for turning power of the projector 1 on and off, a power indicator for notifying a state of on or off of power, a lamp switch key for turning on a later-described halogen lamp, a lamp indicator for showing an on-state of the halogen lamp, an overheat indicator for alarming when the halogen lamp, etc. is over-heated, and the like.

Figure 2:
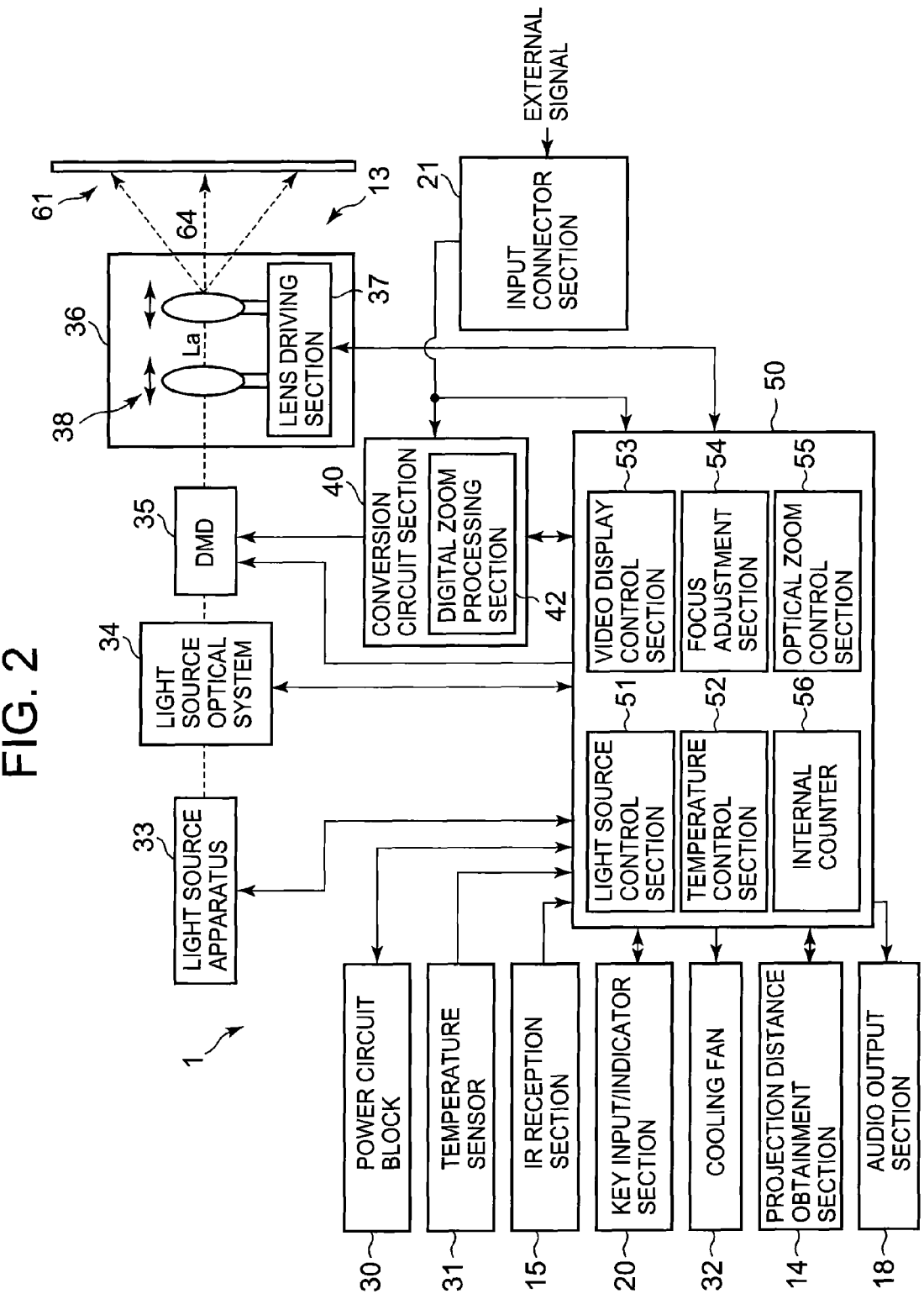
FIG. 2 is an explanatory diagram showing a projector according to the first embodiment.

FIG. 2 is a conceptual view showing the inside of the box of the projector 1.

The projector 1 includes inside the box thereof operation blocks such as a power circuit block 30, a temperature sensor 31 for sensing internal temperature of the projector 1, a cooling fan 32 for cooling internal temperature of the projector 1 according to the temperature sensed by the temperature sensor 31, a light source apparatus 33 including a halogen lamp with high intensity, a conversion circuit section 40 for converting an external signal input externally through the input connector section 21 to video data corresponding to a later-described display element, a digital micromirror device (DMD) 35 as a display element for visualizing a video according to the video data converted by the conversion circuit section 40, a projection optical system 36 for projecting light from the halogen lamp reflected in a predetermined direction by the DMD 35 to the projection plane 61 and the like. The projector 1 also includes a control section 50 for centrally controlling the above-described operation blocks. A light source optical system 34 is disposed between the halogen lamp and the DMD 35 for splitting light output from the halogen lamp into color components and assembling the light to the DMD 35.

As for the DMD 35, a plurality of micromirrors are arranged in a matrix on a substrate, and the plurality of micromirrors reflect light from a halogen lamp entering tilted to one direction from a front direction of the substrate.

Specifically, in the DMD 35, each micromirror reflects the light entering the DMD 35 into a beam switching between an on-state beam in a front direction and an off-state beam in an oblique direction by switching the tilting direction of the micromirror according to video data input from the conversion circuit section 40. The light reflected in the front direction as an on-state beam is projected to the projection plane 61 by the projection optical system 36. The light reflected as an off-state beam is absorbed by the light absorption plate. In short, a bright state by reflecting in the front direction and a dark state by reflecting in the oblique direction visualizes the video. Grayscales are represented by time division drive such as controlling the time ratio of bright state and dark state in a predetermined time period.

The projection optical system 36 projects light reflected in the front direction by the DMD 35 onto the projection plane 61. The projection optical system 36 is configured with a focus lens for focusing the projected video on the projection plane 61, a lens group 38 including a zoom lens which optically enlarges and reduces the projected video, a lens driving section 37 to move a position of a focus lens or a zoom lens forward and backward along a main optical axis La.

Figure 3:
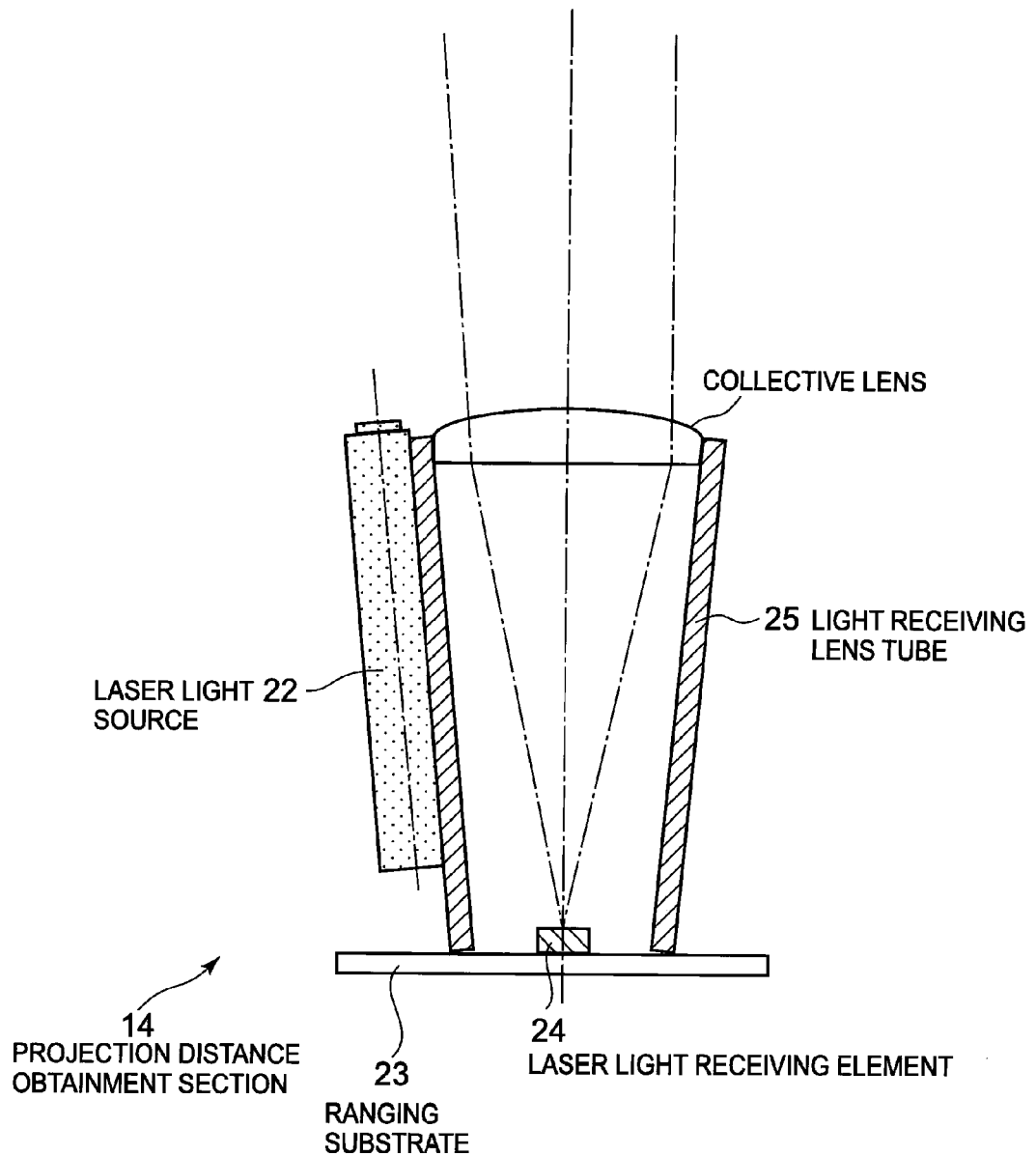
FIG. 3 is an explanatory diagram showing a projection distance obtainment section.

FIG. 3 is a schematic view showing a projection distance obtainment section 14.

The projection distance obtainment section 14 includes a ranging substrate 23, a laser light receiving element 24 fixed to the ranging substrate 23, a light receiving lens tube 25 which is a circular truncated cone-shaped cylindrical body with openings on both end faces arranged around the laser light receiving element 24, a laser light source 22 arranged on an outside surface of the light receiving lens tube 25 for outputting a pulsed laser with a peak wavelength in, for example, the red area and a collective lens 26 arranged at a tip of the light receiving lens tube. The laser light receiving element 24 receives light of the pulsed laser which is output from the laser light source 22 and returns by being reflected on an observation plane. The laser light receiving element 24 has higher light receiving sensitivity at the peak wavelength of the pulsed laser than that at the other wavelength regions.

In other words, as for the projection distance obtainment section 14, the pulsed laser output from the laser light source reflected on the observation plane (projection plane 61) returns to be detected by the laser light receiving element 24, and a distance to the observation plane is to be obtained according to the time consumed for the pulsed laser to go and return.

Figure 4:
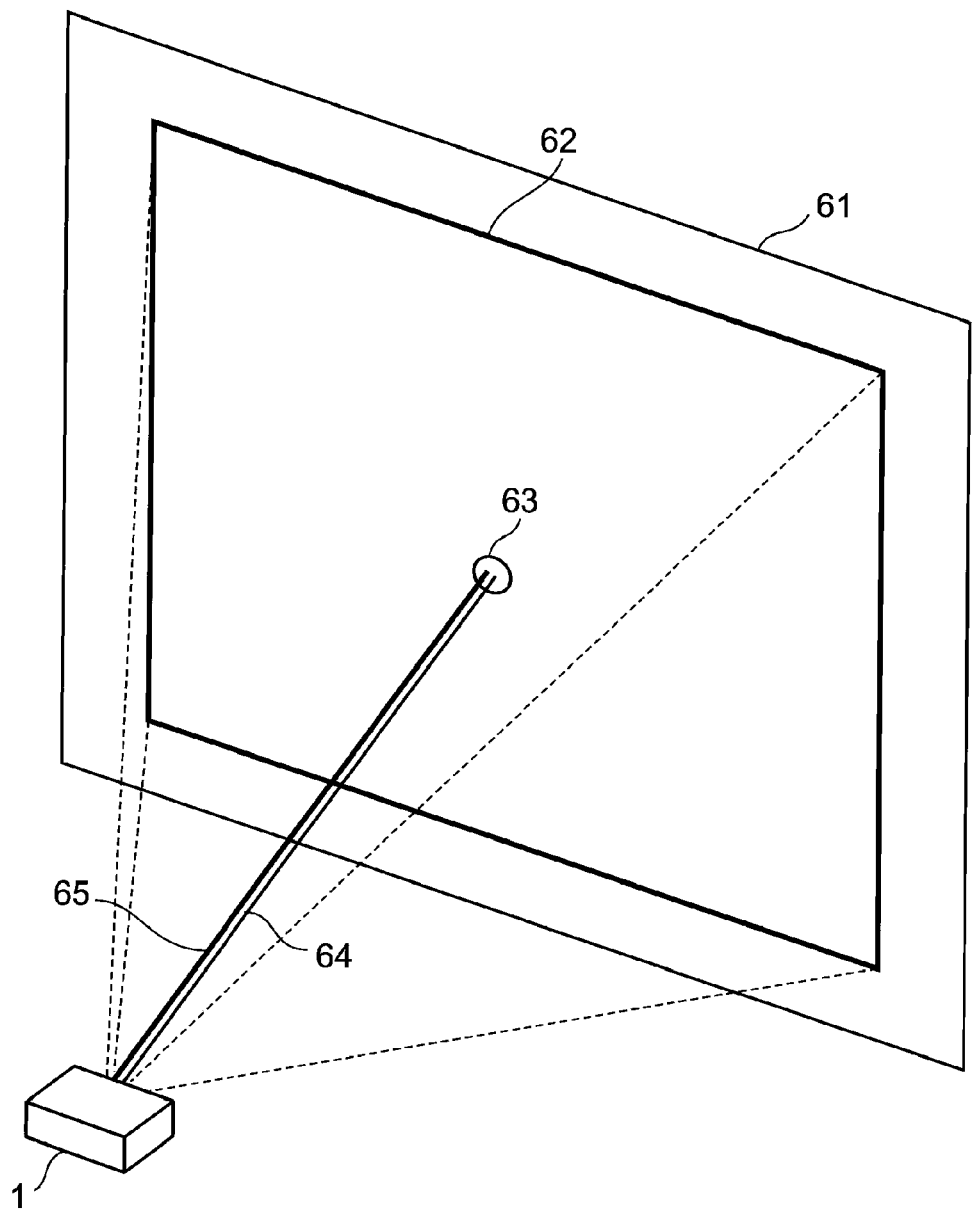
FIG. 4 is an explanatory diagram showing a laser ranging point according to the first embodiment.

As shown in FIG. 4, the projection distance obtainment section 14 is disposed at a position such that a laser ranging point 63, which is an area irradiated with the pulsed laser, is near an approximate center of a video area 62 of the video projected on the projection plane 61 when a distance to the projection plane 61 is at least a predetermined distance or longer. For example, the projection distance obtainment section 14 and the projection optical system 36 are placed close to each other so that a main optical axis 64 of the projected light and a path 65 of a pulsed laser output from the laser light source becomes parallel.

The conversion circuit section 40 converts video signals of various specifications input from the input connector section 21, etc., or a video signal previously stored to a predetermined format. Then, this is developed and processed on an internal video RAM according to color component (for example, red component, green component and blue component) and the stored content of the video RAM is sent to the DMD 35 as video data.

Figure 5:
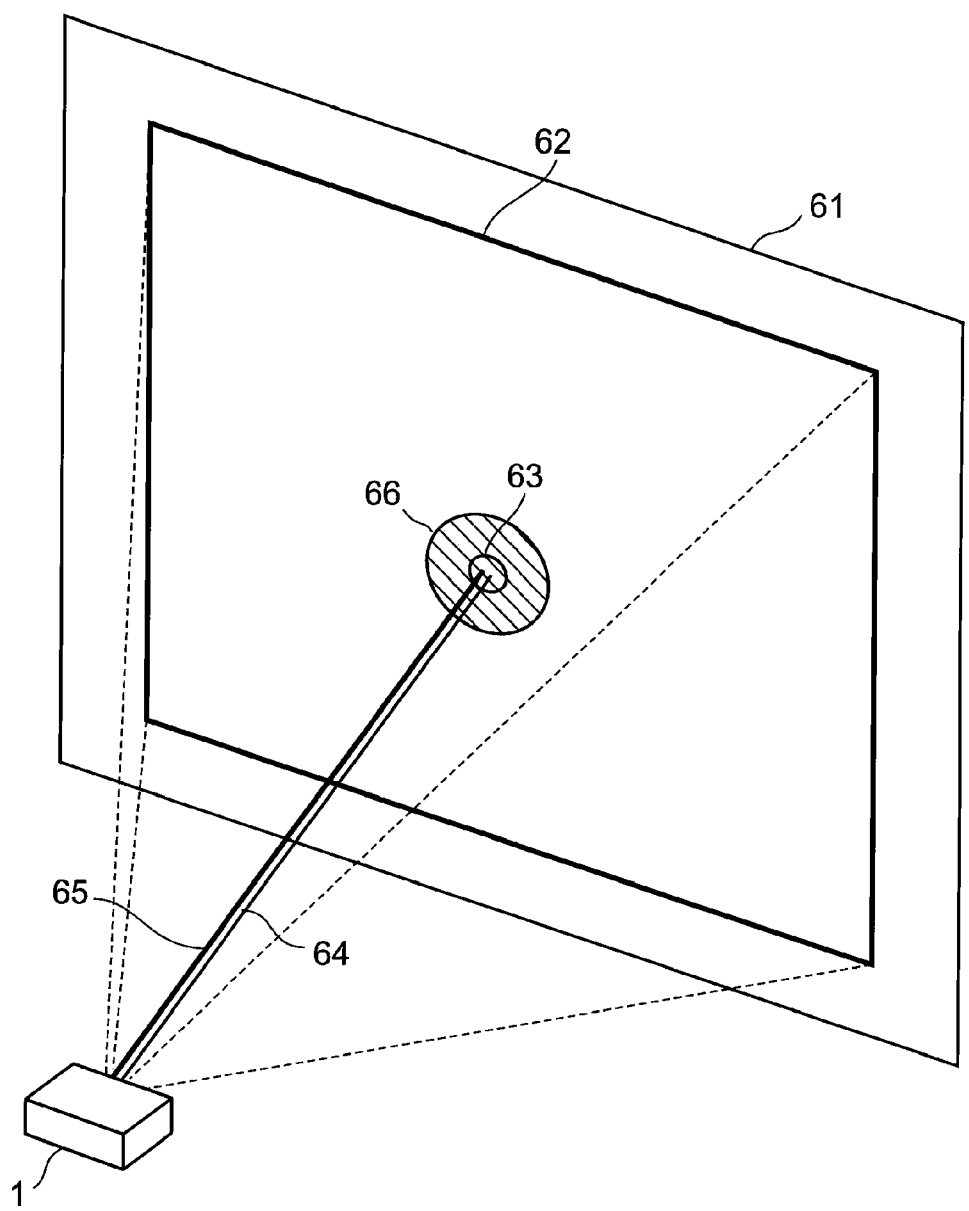
FIG. 5 is an explanatory diagram showing a first video area on a projection plane.

As shown in FIG. 5, when the projection distance to the projection plane 61 is measured by the projection distance obtainment section 14, the conversion circuit section 40 adjusts the video data so that in a video area 66 corresponding to the laser ranging point 63, the intensity value of a display color corresponding to the peak wavelength of the pulsed laser attenuates and sends the video data to the DMD 35.

Specifically, in the present embodiment, as described above, the projection distance obtainment section 14 is disposed so that the pulsed laser output from the laser light source 22 with a peak wavelength in, for example, the red area is irradiated near an approximate center of the projected video, thus the video data is adjusted so that the intensity value of the red component is attenuated in a video area 66 (hereinafter referred to as a first video area) near the approximate center of the projected video and sent to the DMD 35.

Figure 6:
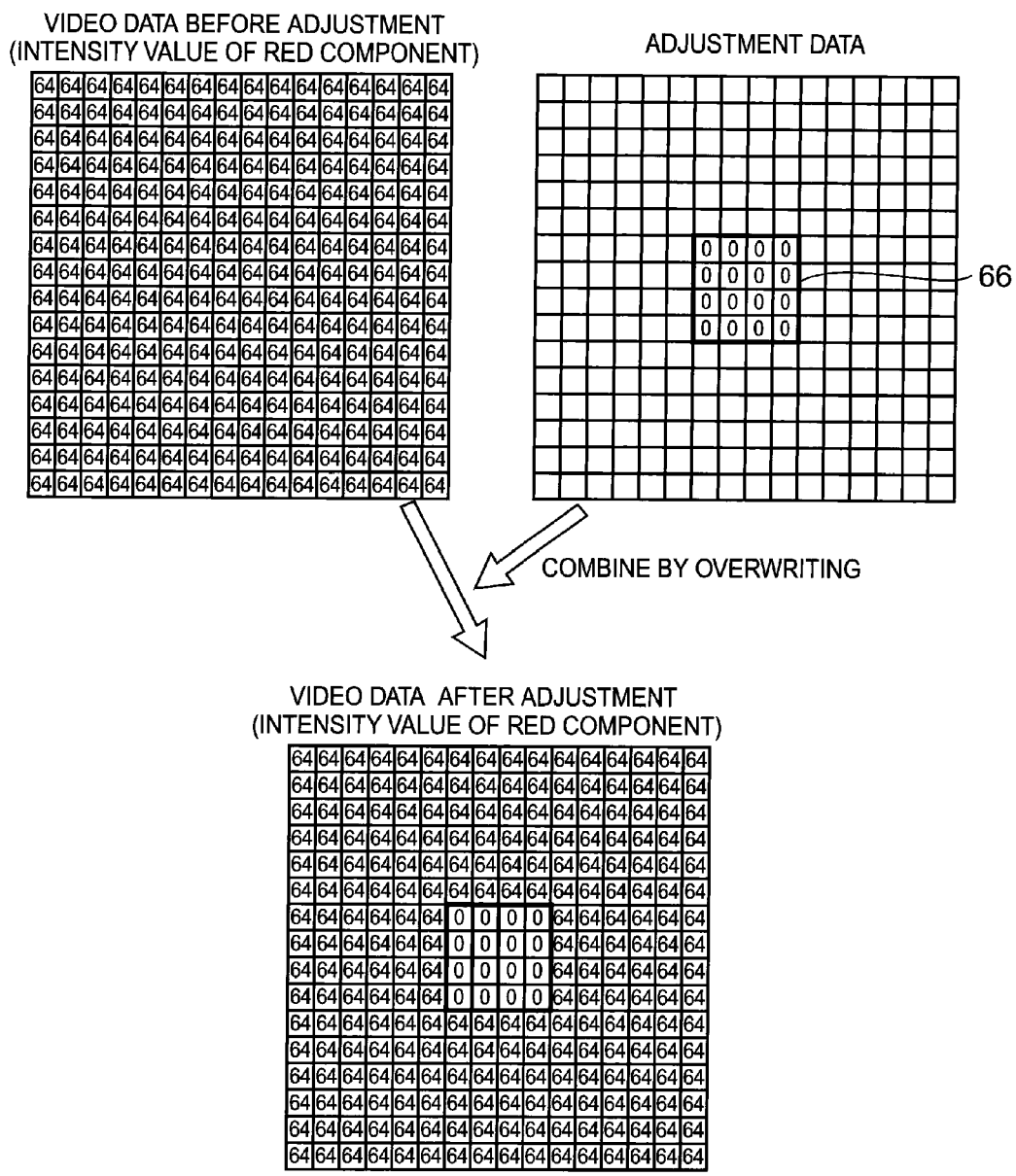
FIG. 6 is an explanatory diagram showing adjustment of video data according to the first embodiment.

For example, as shown in FIG. 6, the video data is adjusted so that the intensity value of the red component as video data developed to the video RAM is reduced in an area near the center of the video area 62. Specifically, the video data is adjusted by the adjustment data in which the intensity value of the red component corresponding to the first video area 66 is 0 being combined by overwriting with video data including the intensity value of the red component, so that the intensity value of the red component in the first video area 66 becomes for example 0. The adjustment data is previously stored.

In other words, the conversion circuit section 40 adjusts the video data in order to prevent the ranging accuracy to the projection plane 61 from reducing by the projected light of the red component projected on the laser ranging point being reflected on the projection plane and entering the laser light receiving element 24 when the projection distance to the projection plane is measured. By adjusting the intensity value of at least only the video data of the color component (here, the red component) corresponding to the peak wavelength of the pulsed laser, the content of the video projected in the first video area when laser ranging is performed can be visually recognized by the video of the color components other than the red component. In FIG. 6, 0 grayscale represents black and intensity becomes higher (white) when closer to 225 grayscales.

The conversion circuit section 40 may include a digital zoom processing section 42. In other words, the conversion circuit section 40 may perform digital enlarging and reducing processing (digital zoom) of the video by the digital zoom processing section 42 according to an operation by a user through the key input/indicator section 20 or the remote controller.

Here, as shown in FIG. 7, digital zoom is, for example, to clip a video area Dz as an object of enlargement from the original video data OD and to enlarge to a video data Bd in the same size (data amount) as the original video data by performing pixel complement processing using functions such as nearest neighbor interpolation, bilinear interpolation and cubic convolution interpolation (bicubic interpolation) on the video data of the video area Dz. Thus, in measuring a distance to the projection plane 61 when a digitally zoomed video is projected, it is preferable that adjustment data as described above overwrites and is combined to the digitally zoomed video data Bd.

The control section 50 includes a ROM storing an operation program fixedly, a RAM which may be used as a work memory and a CPU for developing and performing the program stored in the ROM. As shown in FIG. 2, the function block structure of the control section 50 includes, a light source control section 51 for turning on a halogen lamp of the light source apparatus 33 according to an operation of the lamp switch key, a temperature control section 52 controlling to rotate the cooling fan 32 according to a temperature detected by the plurality of temperature sensors 31 provided in the light source apparatus 33 and the like, a video display control section 53 for allowing the conversion circuit section 40 to adjust video data and the DMD to visualize a video according to the video data, a focus adjustment section 54 for controlling the movement of the position of the focus lens through the lens driving section 37 according to a distance to the projection plane 61 obtained by the projection distance obtainment section 14, and an optical zoom control section 55 for controlling the optical zoom processing (optical zoom) of the projected video by moving the position of the zoom lens through the lens driving section 37. The light source control section 51 also performs control of turning off the lighted halogen lamp according to the temperature detected by the temperature sensor 31. Even after the halogen lamp is turned off, the temperature control section 52 continues to allow the cooling fan 32 to rotate until the temperature detected by the temperature sensor 31 decreases to a predetermined temperature or for a predetermined period of time.

The video display control section 53 visualizes a video by the conversion circuit section 40 and the DMD 35 and displays the video on the projection plane according to a video signal as an external signal input through the input connector section 21 or a video signal previously stored. When the projection distance obtainment section 14 measures with the laser the projection distance to the projection plane 61, the video display control section 53 allows the conversion circuit section 40 to perform the above-described processing on the video data so that the video visualized by the DMD 35 is in a status of display for measuring the projection distance.

The focus adjustment section 54 adjusts the position of the focus lens according to the projection distance obtained by the projection distance obtainment section 14. Specifically, the position of the focus lens where the projected image formed on the projection plane 61 can be focused is previously stored in the internal memory corresponding to the projection distance. When the projection distance is obtained by the projection distance obtainment section 14, the focus adjustment section 54 reads out the position of the focus lens corresponding to the obtained projection distance from the internal memory to drive the lens driving section 37 so that the position of the focus lens is in the read out position.

The optical zoom control section 55 controls the optical enlarging and reducing of the projected video according to an operation by the user through the key input/indicator section 20 or the remote controller. Specifically, the position of the zoom lens corresponding to a zoom magnification is previously stored in the internal memory and the optical zoom control section 55 reads out from the internal memory the position of the focus lens corresponding to the zoom magnification according to the operation by the user to drive the lens driving section 37 so that the position of the zoom lens is in the position read out.

Figure 8:
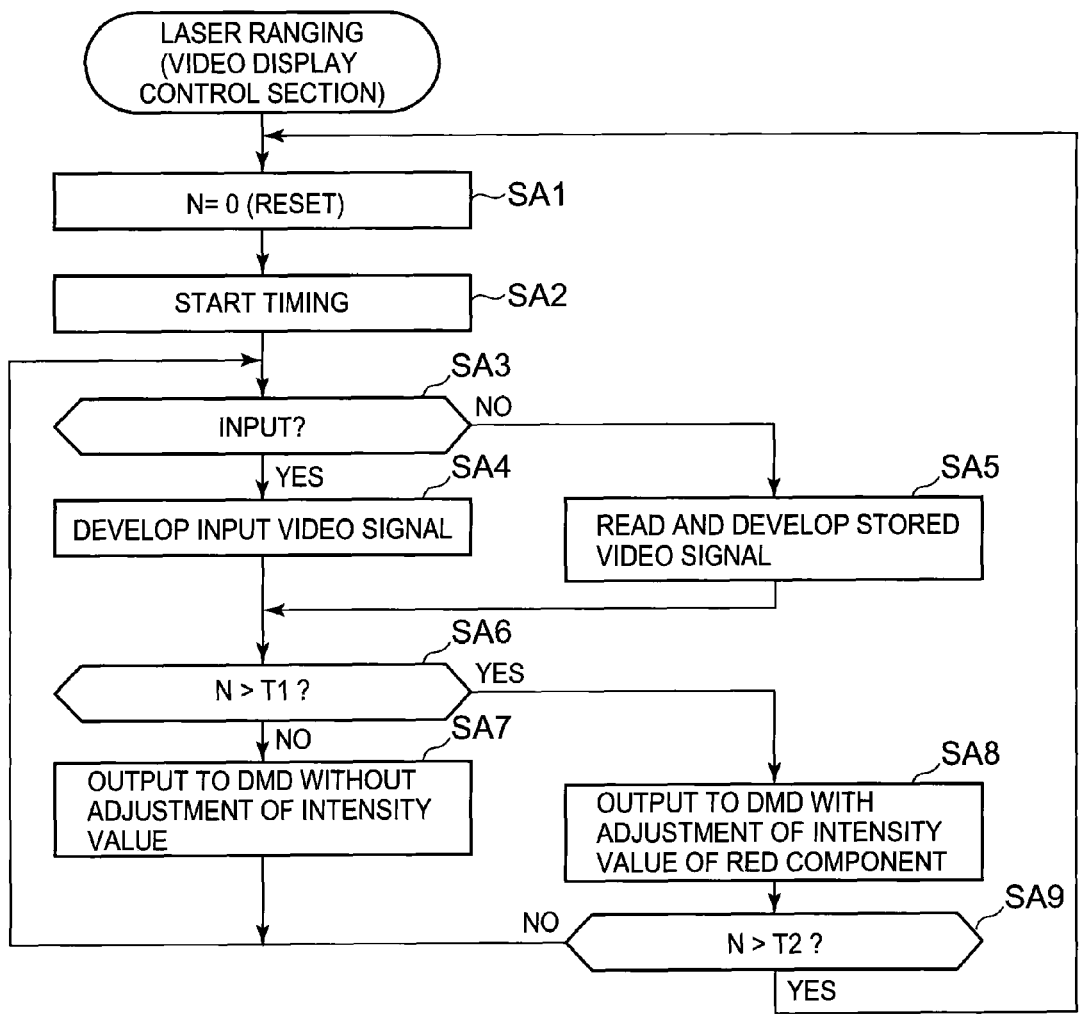
FIG. 8 is a flow chart showing a description of an operation of a video display control section.

In the following, the operation of the laser ranging in the above-described projector 1 will be described by describing the operation of the video display control section 53 and the focus adjustment section 54 separately. First, the operation of the video display control section 53 will be described with reference to the flow chart shown in FIG. 8.

When power of the projector 1 is turned on, the video display control section 53 resets the count N of the previously built-in internal counter 56 to 0 and starts counting (timing) (SA1, SA2).

Then, the video display control section 53 detects whether or not there is a video signal externally input through the input connector section 21 (SA3).

When there is an external video signal (SA3/Y), the conversion circuit section 40 converts the video signal to a predetermined format and this is developed to the video RAM as video data according to color component (for example, red component, green component and blue component) (SA4).

On the other hand, when there is no external video signal, a video signal previously stored such as a blue back video is read out and the conversion circuit section 40 converts the video signal to a predetermined format. This is developed to the video RAM as video data according to color component (for example, red component, green component and blue component) (SA5).

When the count N of the internal counter 56 does not exceed a first threshold T1 (SA6/N), the video data developed to the video RAM is output as it is to the DMD (SA7) and the operation returns to step SA3. Here, the first threshold T1 is set as a time interval of the laser ranging performed periodically and a predetermined value may be stored in advance as the first threshold T1 or the value can be changed according to an operation by the user through the key input/indicator section 20 or the remote controller.

On the other hand, when the count N of the internal counter 56 exceeds the first threshold T1 (SA6/Y), the video display control section 53 allows the conversion circuit section 40 to adjust the video data of the red component among the video data developed to the video RAM so that the intensity value of the first video area attenuates. Then, the adjusted video data is output by the DMD 35 (SA8). As for the video data other than the red component, the video data developed to the video RAM is output as it is by the DMD 35.

When the count N timed continuously by the internal counter 56 does not exceed a second threshold T2 larger than the first threshold T1 (SA9/N), the operation returns to step SA3. On the other hand, when the count N of the internal counter 56 exceeds the second threshold T2 (SA9/Y), the operation returns to step SA1 and the count N of the internal counter 56 is reset to 0.

In other words, the video display control section 53 controls the display of the video for ranging as shown in FIG. 5 at a predetermined time interval. The video display control section 53 continues to display the video for ranging as shown in FIG. 5 from when the internal counter is the first threshold T1 until the second threshold T2 which is enough time for the projection distance obtainment section 14 to measure the projection distance to the projection plane 61. Here, as for the second threshold T2, a predetermined value may be stored in advance as the second threshold T2 or the value can be changed according to an operation by the user through the key input/indicator section 20 or the remote controller.

Figure 9:
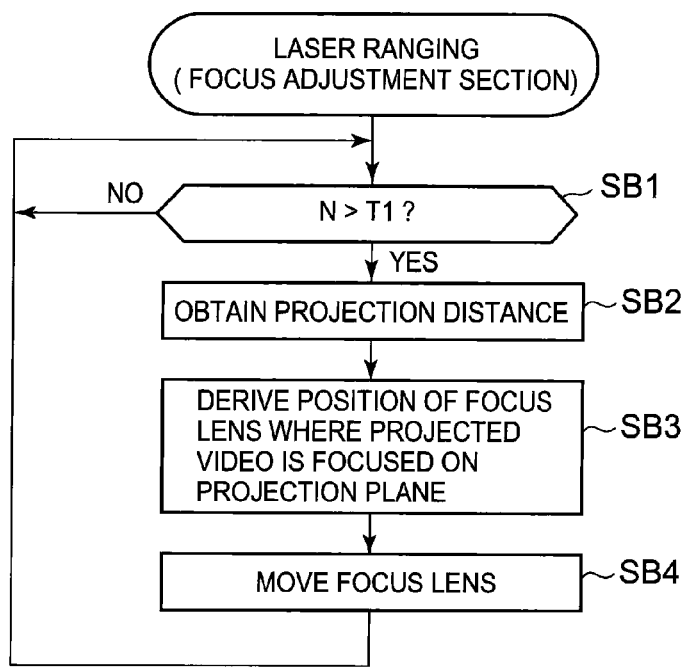
FIG. 9 is a flow chart showing a description of an operation of a focus adjustment section.

Next, the operation of the focus adjustment section 54 will be described with reference to the flow chart shown in FIG. 9.

When the counter N of the internal counter 56 exceeds the first threshold T1 (SB1), the focus adjustment section 54 allows the projection distance obtainment section 14 to output the pulsed laser. Then, the projection distance to the projection plane 61 is obtained according to the time consumed for the pulsed laser to be reflected on the projection plane 61 and to return (SB2).

At this time, as shown in FIG. 5 and FIG. 6, the video projected on the projection plane 61 has attenuated display color of the red component in the first video area 66 corresponding to the laser ranging point 63. Thus, the light of the red component of the projected video can be prevented from entering the laser light receiving element 23, and as a result, the projection distance to the projection plane 61 can be obtained accurately. Also, since the projection distance to the projection plane 61 is obtained using the laser, the time for obtaining the projection distance can be shortened.

Next, the focus adjustment section 55 derives the position of the focus lens where the projected video is focused on the projection plane 61 according to the obtained projection distance (SB3). In other words, the focus adjustment section 55 reads out from the internal memory the focus lens position data corresponding to the obtained projection distance.

Then, the focus adjustment section 55 moves the focus lens by the lens driving section 37 to the derived focus lens position (SB4) and the operation returns to step SB1.

Second Embodiment

The second embodiment when a projection apparatus of the present invention is implemented in a projector 2 will be described with reference to the drawings. In the second embodiment, obtaining a projection distance from a projection plane 61, where a video is projected by the projector 2, to the projector 2 and performing distortion correction (keystone correction) of the projected video according to the obtained projection distance will be described. The description of those with the same structure as the first embodiment will be omitted.

Figure 10:
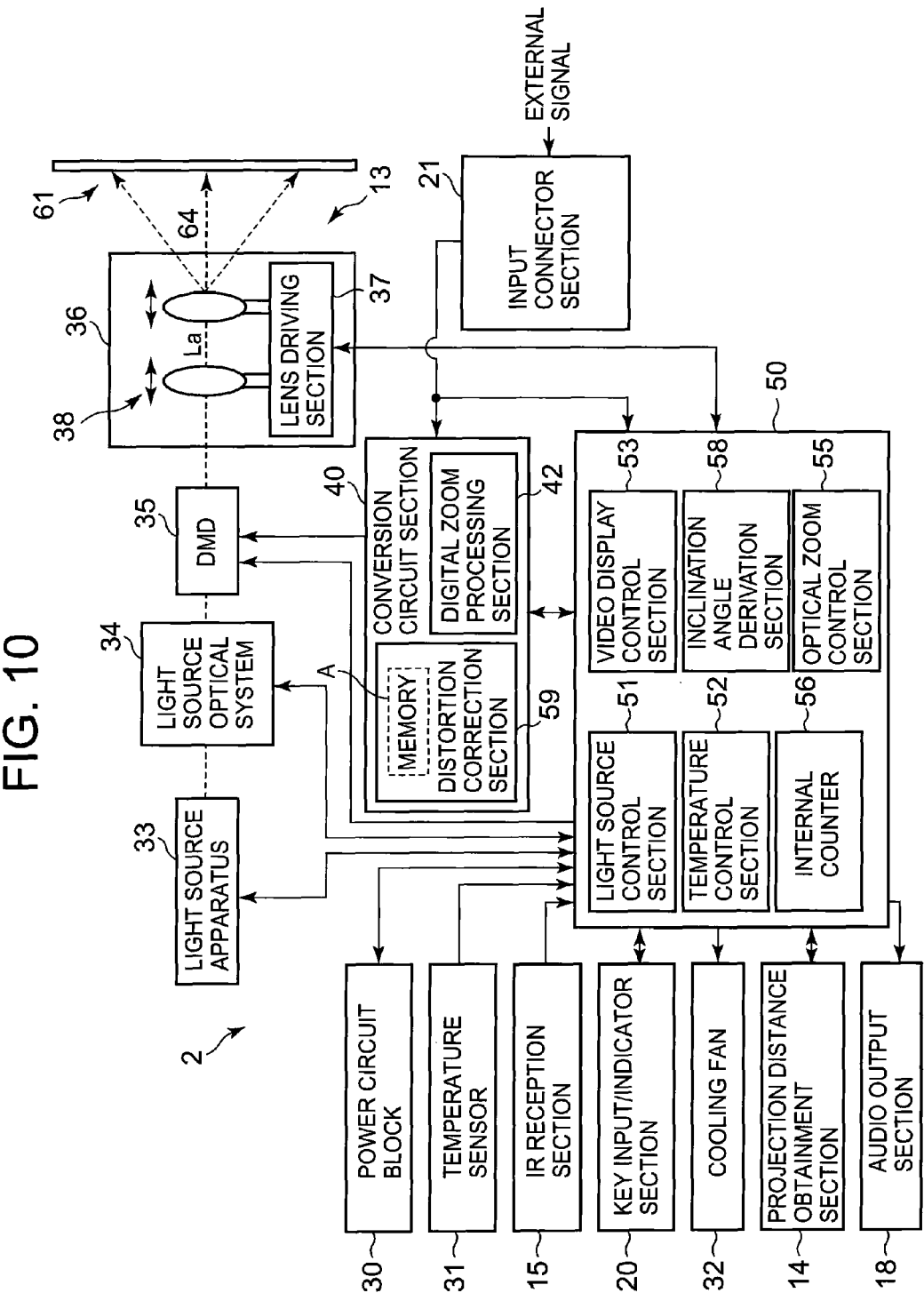
FIG. 10 is an explanatory diagram showing a projector according to the second embodiment.

As shown in FIG. 10, in addition to the first embodiment, the projector 2 further includes an inclination angle obtainment section 58 and a distortion correction section 59, described below.

The inclination angle derivation section 58 derives the inclination angle according to the projection distance obtained with the projection distance obtainment section 14 by the control section 50. The distortion correction section 59 allows the conversion circuit section 40 to adjust the video data so as to correct keystone distortion of the projected video according to the inclination angle derived by the inclination angle derivation section 58. The description of the focus adjustment section 54 is omitted.

Here, the inclination angle of the projection plane 61 to the projector 2 can be derived by obtaining distances to at least three different points which are not in a straight line on the projection plane.

Figure 11:
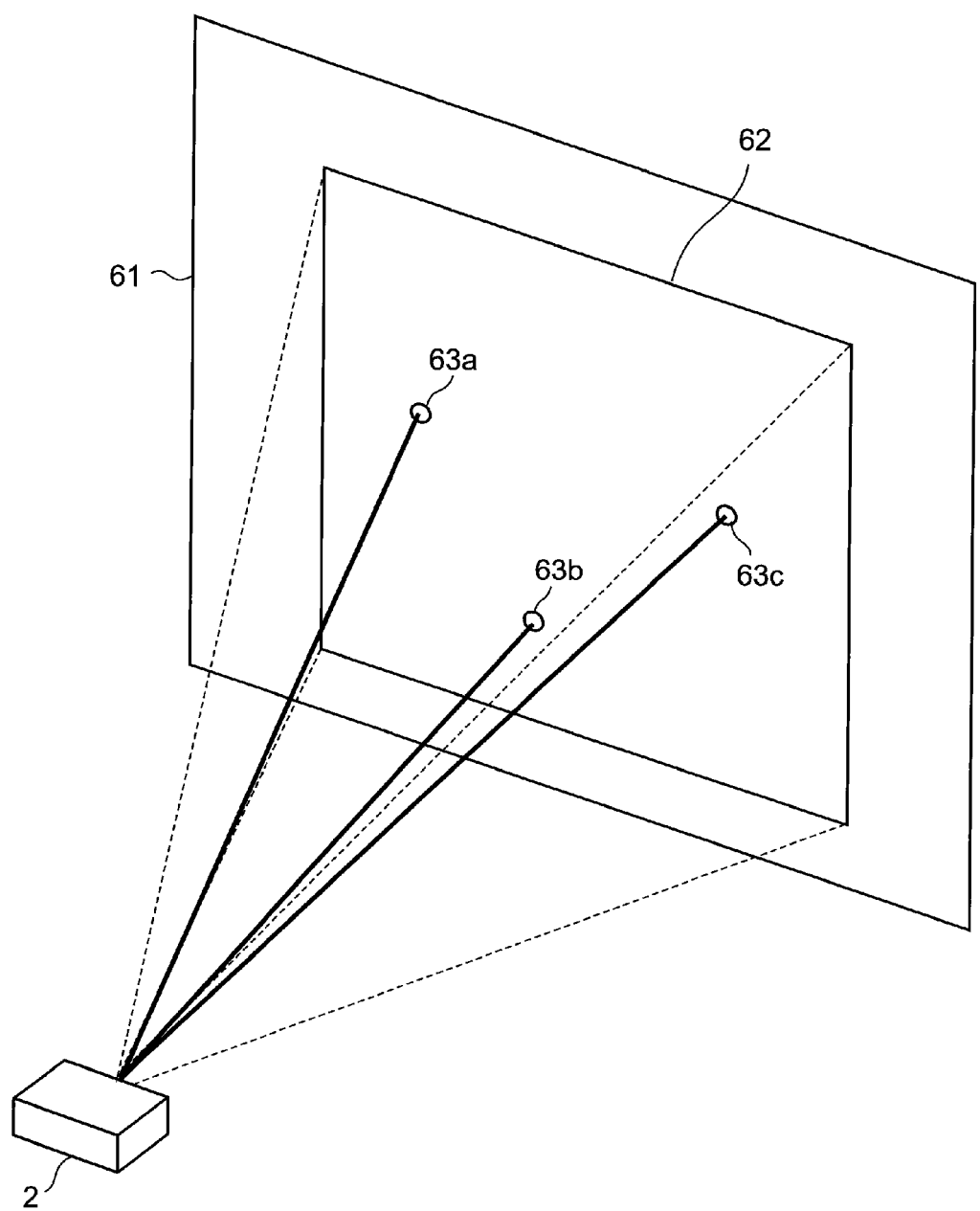
FIG. 11 is an explanatory diagram showing a laser ranging point according to the second embodiment.

Thus, in the second embodiment, the projection distance obtainment section 14 successively irradiates three laser ranging points 63a, 63b and 63c on the projection plane 61 with pulsed laser, as shown in FIG. 11 for example, and obtains the projection distance to each point. When the projection distance obtainment section 14 is provided on the projector 2 using a movable section, by suitably controlling the movable section, the pulsed laser can be output in three different directions on the projection plane 61 and the projection distance to each point can be obtained.

Then, the inclination angle derivation section 58 derives the inclination angles θv and θh of the projection plane 61 to a main optical axis 64 of a projected light of the projector according to the projection distances obtained by the projection distance obtainment section 14. θv is the inclination angle of the projection plane 61 to the main optical axis 64 in a vertical direction and θh is the inclination angle in a horizontal direction.

Figure 12:
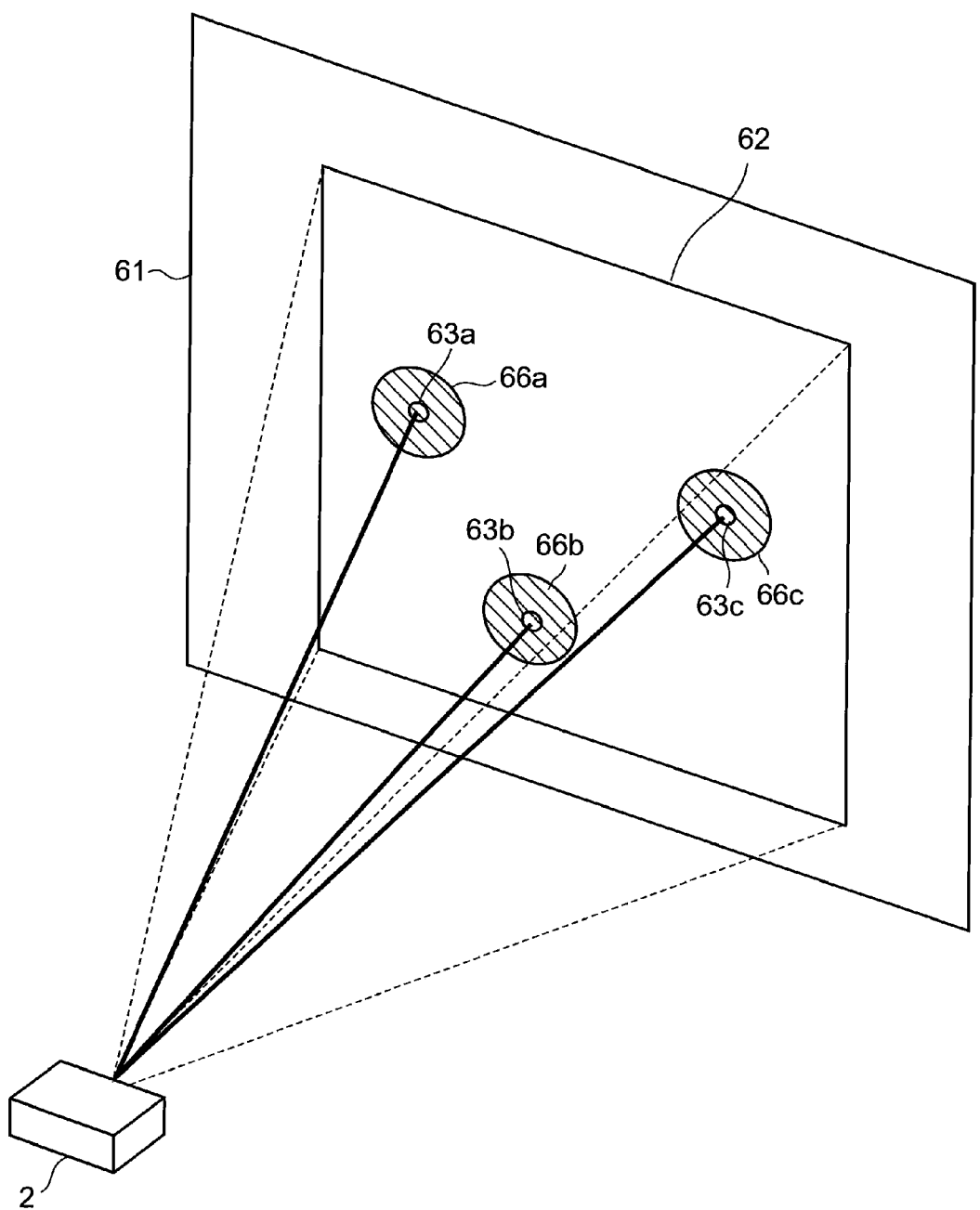
FIG. 12 is an explanatory diagram showing a second video area on the projection plane.

As shown in FIG. 12, in the second embodiment, when the projection distance to the projection plane 61 is measured by the projection distance obtainment section 14, the conversion circuit section 40 adjusts the video data so that the intensity value of the displayed color corresponding to the peak wavelength of the pulsed laser is attenuated in video areas 66a, 66b and 66c (hereinafter referred to as second video area) corresponding to the laser ranging points 63a, 63b and 63c and sends the data to the DMD 35.

Figure 13:
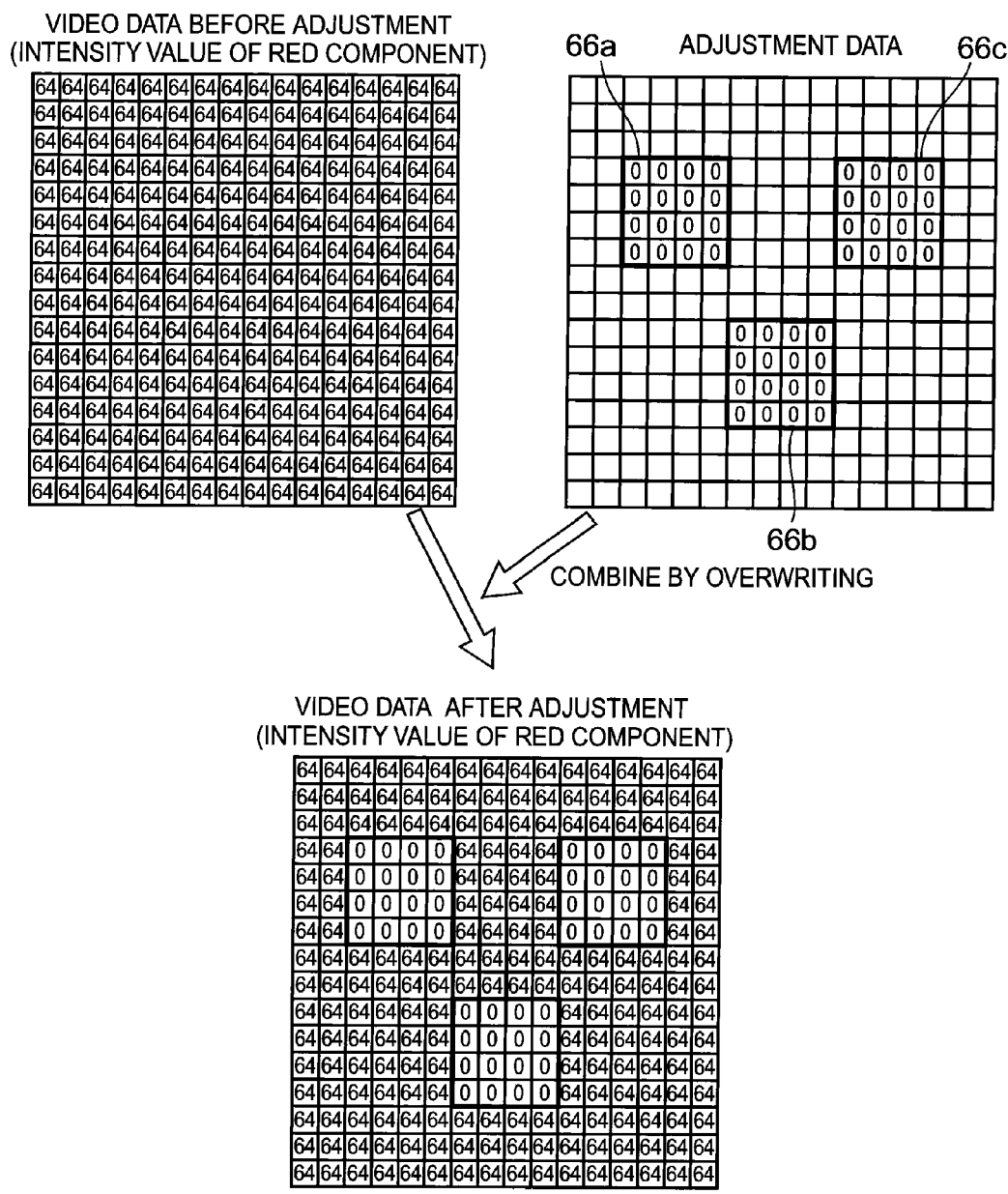
FIG. 13 is an explanatory diagram showing adjustment of video data according to the second embodiment.

For example, as shown in FIG. 13, the video data is adjusted so that the intensity value of the red component as video data developed to the video RAM is reduced in the second video areas 66a, 66b and 66c. Specifically, the video data is adjusted by the adjustment data in which the intensity value of the red component corresponding to the second video areas 66a, 66b and 66c are 0 being combined by overwriting with video data including the intensity value of the red component, so that the intensity value of the red component in the second video areas 66a, 66b and 66c become for example 0. The adjustment data is previously stored.

In other words, the conversion circuit section 40 adjusts the video data in order to prevent the ranging accuracy to the projection plane 61 from reducing by the projected light of the red component projected on the laser ranging point being reflected on the projection plane and entering the laser light receiving element 24 when the projection distance to the projection plane 61 is measured. By adjusting the intensity value of at least only the video data of the color component (here, the red component) corresponding to the peak wavelength of the pulsed laser, the content of the video projected in the second video area when laser ranging is performed can be visually recognized by the video of the color components other than the red component. In FIG. 13, 0 grayscale represents black and intensity becomes higher (white) when closer to 225 grayscales.

The conversion circuit section 40 corrects the keystone distortion of the projected video according to the inclination angles θv and θh derived by the inclination angle derivation section 58 by using the distortion correction section 59. In other words, the conversion circuit section 40 converts video data of each color component developed to the video RAM using a predetermined keystone correction conversion function substituted with inclination angles θv and θh derived by the inclination angle derivation section 58 to derive video data with keystone correction and outputs the data to the DMD 35.

When the conversion circuit section 40 performs on the predetermined video data both the above-described keystone correction processing and the previously described attenuation processing of the predetermined displayed color, the attenuation processing of the predetermined displayed color is followed by the keystone correction processing.

Figure 14:
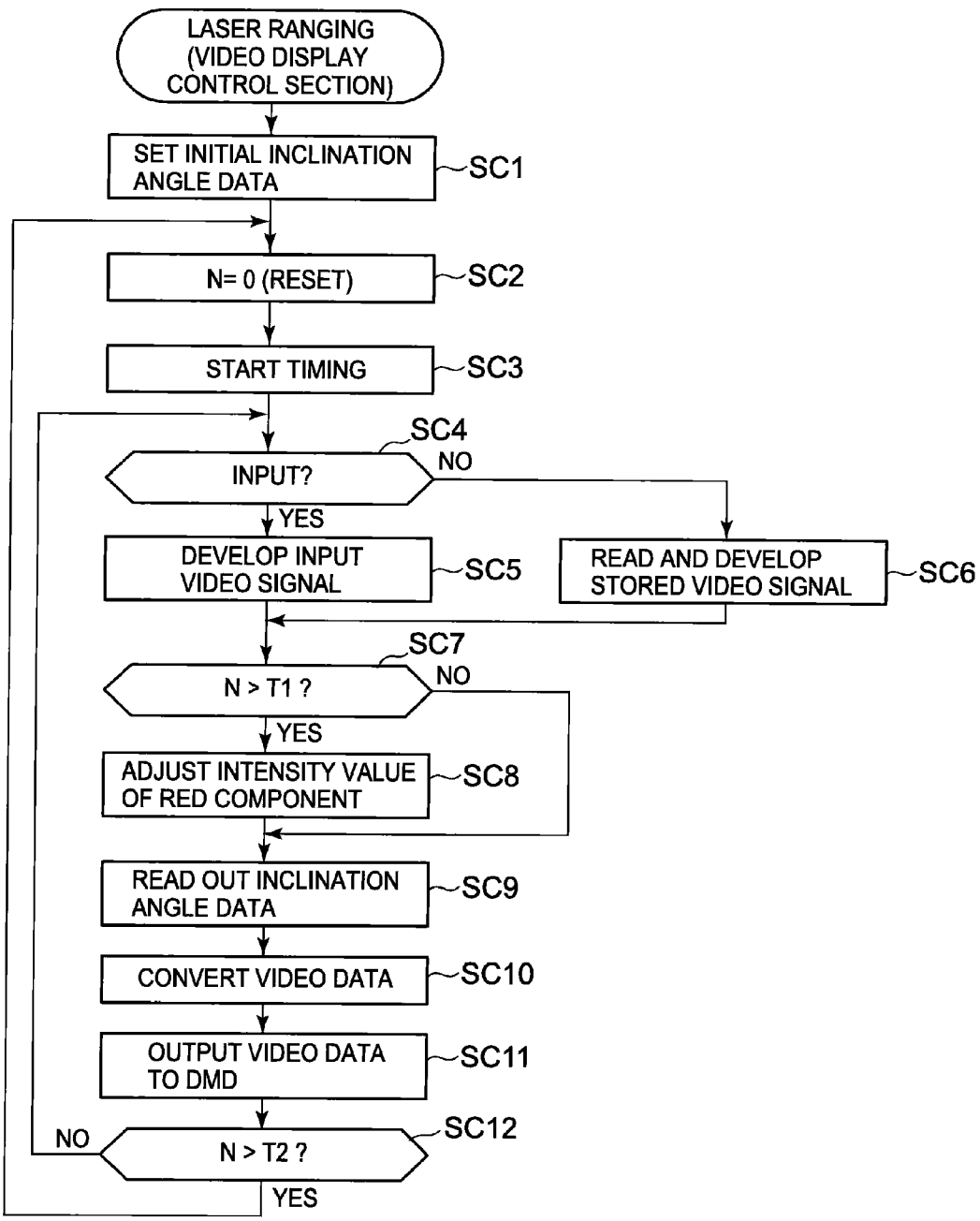
FIG. 14 is a flow chart showing a description of an operation of a video display control section.

In the following, the operation of the laser ranging in the above-described projector 2 will be described by describing the operation of the video display control section 53 and the inclination angle derivation section 58 separately. First, the operation of the video display control section 53 will be described with reference to the flow chart shown in FIG. 14.

When power of the projector 2 is turned on, the video display control section 53 sets in the memory A in the conversion circuit section 40 initial inclination angle data showing the projection plane 61 is perpendicular to the main optical axis 64 of the projected light of the projector 2 (SC). In other words, under the initial inclination angle data, when the video data is input in the keystone correction conversion function, the obtained output is equal to the input video data. While the initial inclination angle data is set in the memory A, the keystone correction processing section 59 substantially does not perform keystone correction of the video data.

Next, the video display control section 53 resets the count N of the previously built-in internal counter 56 to 0 and starts counting (timing) (SC2, SC3).

Then, the video display control section 53 detects whether or not there is a video signal externally input through the input connector section 21 (SC4).

When there is an external video signal (SC4/Y), the conversion circuit section 40 converts the video signal to a predetermined format and this is developed to the video RAM as video data according to color component (for example, red component, green component and blue component) (SC5).

On the other hand, when there is no external video signal, a video signal previously stored such as a blue back video is read out and the conversion circuit section 40 converts the video signal to a predetermined format. This is developed to the video RAM as video data according to color component (for example, red component, green component and blue component) (SC6).

When the count N of the internal counter 56 exceeds the first threshold T1 (SC7/Y), the video display control section 53 allows the conversion circuit section 40 to adjust the video data of the red component among the video data developed to the video RAM so that the intensity value of the second video area 66a, 66b and 66c reduces, as described above (SC8). As for the video data other than the red component, at least at this point, the video data is not adjusted.

When the count N of the internal counter 56 does not exceed the first threshold T1 (SC7/N), at least at this point, the video data of the color components developed to the video RAM is not adjusted.

Next, the video display control section 53 allows the conversion circuit section 40 to read out the inclination angle data set in the memory A (SC9). The video display control section 53 substitutes this inclination angle data in the keystone correction conversion function and performs keystone correction conversion to the video data developed on the video RAM according to the keystone correction conversion function (SC10). Then, the converted video data is output to the DMD 35 (SC11). The inclination angle data set in the memory A is suitably overwritten and updated by a later-described operation of the inclination angle derivation section 58, so that the inclination angles θv and θh of the projection plane 61 to the main optical axis 64 of the projected light correspond to those of the particular point in time.

As for the video display control section 53, when the count N timed continuously by the internal counter 56 does not exceed a second threshold T2 larger than the first threshold T1 (SC12/N), the operation returns to step SC4. On the other hand, when the count N of the internal counter 56 exceeds the second threshold T2 (SC12/Y), the operation returns to step SC2 and the count N of the internal counter 56 is reset to 0.

Figure 15:
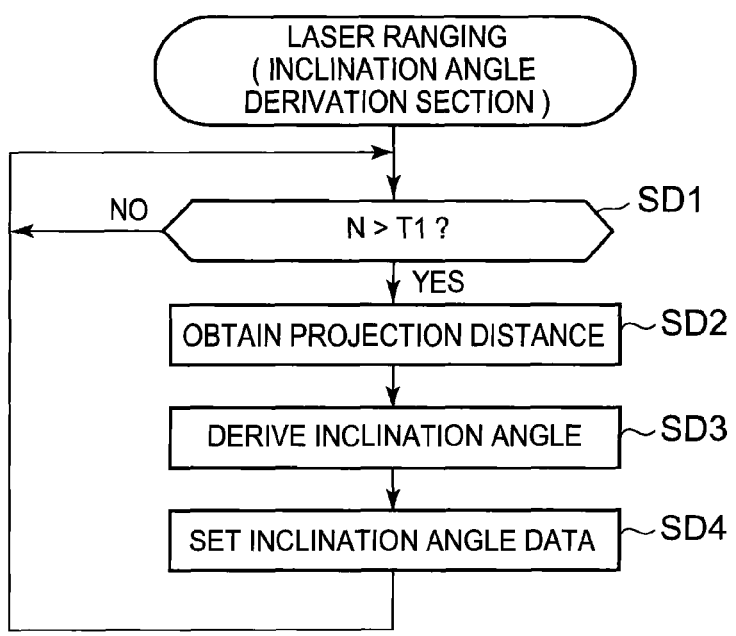
FIG. 15 is a flow chart showing a description of an operation of an inclination angle derivation section.

Next, the operation of the inclination angle derivation section 58 will be described with reference to the flow chart shown in FIG. 15.

When the counter N of the internal counter 56 exceeds the first threshold T1 (SD1), the inclination angle derivation section 58 allows the projection distance obtainment section 14 to output the pulsed laser. Then, the projection distance to the projection plane 61 is obtained according to the time consumed for the pulsed laser to be reflected on the projection plane 61 and to return (SD2). The projection distance obtainment section 14 successively irradiates to the three laser ranging points 63*a*, 63*b* and 63*c* on the projection plane 61 with the pulsed laser and obtains the projection distance to each point. At this time, as shown in FIG. 12 and FIG. 13, the video projected on the projection plane 61 has attenuated display color of the red component in the second video areas 66*a*, 66*b* and 66*c* corresponding to the laser ranging points 63*a*, 63*b* and 63*c*. Thus, the light of the red component of the projected video can be prevented from entering the laser light receiving element 23, and as a result, the projection distance to the projection plane 61 can be obtained accurately. Also, since the projection distance to the projection plane 61 is obtained using the laser, the time for obtaining the projection distance can be shortened.

Next, the inclination angle derivation section 58 derives inclination angles θv and θh of the projected plane 61 to the main optical axis 64 of the projected light of the projector 2 according to the obtained projection distance (SD3). Then, the derived inclination angles θv and θh are set in the memory A in the conversion circuit section 40 as inclination angle data (SD4), and the operation returns to step SD1.

In other words, the inclination angle derivation section 58 periodically overwrites and updates the inclination angle data of the memory A so that the keystone correction performed by the distortion correction section 59 corresponds to the inclination angles θv and θh of the projected plane 61 to the main optical axis 64 of the projected light of the particular point in time. The video display control section 53 adjusts the display status of the projected video in synchronization with the operation of the inclination angle derivation section 58 so that the projection distance obtained by the projection distance obtainment section 14 is highly accurate.

In the above-described embodiment, an example using the same adjustment data regardless of optical zoom magnification adjusted by the optical zoom control section 55 is described, however the adjustment data may be switched according to the optical zoom magnification.

Figure 16A:
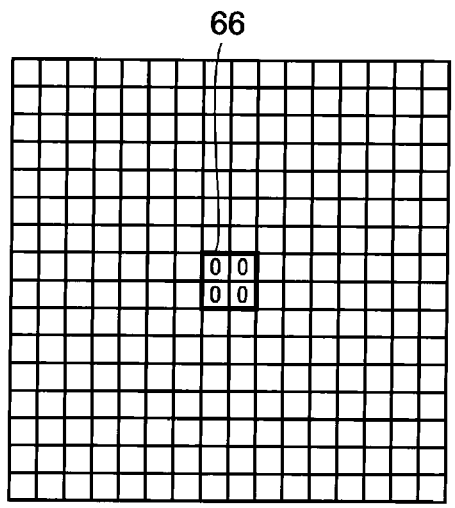
FIG. 16A and FIG. 16B are explanatory diagrams showing adjustment data.
Figure 16B:
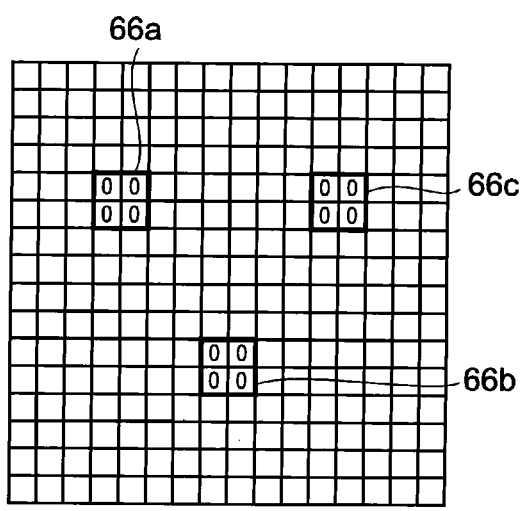
Figure 17A:
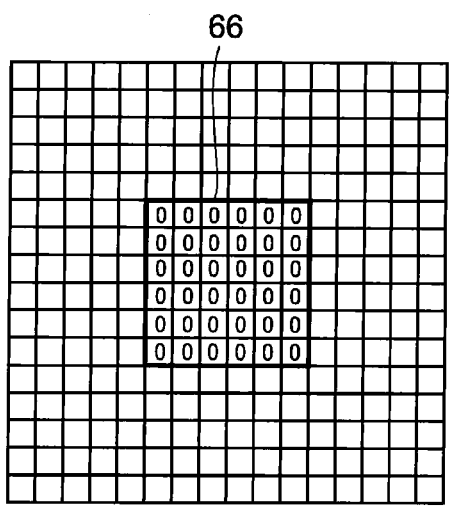
FIG. 17A and FIG. 17B are explanatory diagrams showing adjustment data.
Figure 17B:
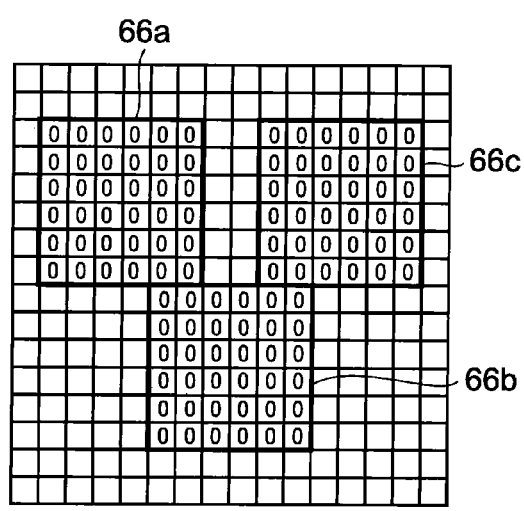

For example, when the optical zoom magnification is high, since the video projected on the projection plane 61 is enlarged to a relatively large degree, the first video area 66 or the second video areas 66*a*, 66*b* and 66*c* on the projection plane 61 are also enlarged to a relatively large degree. Thus, in such cases, the first video area 66 or the second video areas 66*a*, 66*b* and 66*c* may be projected larger than necessary compared to the laser ranging points 63, 63*a*, 63*b* and 63*c*. In such cases, as shown in FIG. 16A and FIG. 16B, it is preferable that the adjustment data is switched so that the first video area 66 or the second video areas 66*a*, 66*b* and 66*c* are relatively small compared to the whole video area. On the other hand, when the optical zoom magnification is low, since the video projected on the projection plane 61 is reduced to a relatively small degree, the first video area 66 or the second video areas 66*a*, 66*b* and 66*c* are also reduced to a relatively small degree. Thus, in such cases, the first video area 66 or the second video areas 66*a*, 66*b* and 66*c* may be small compared to the laser ranging points 63, 63*a*, 63*b* and 63*c* and may be projected to an insufficient extent. In such cases, as shown in FIG. 17A and FIG. 17B, it is preferable that the adjustment data is switched so that the first video area 66 or the second video areas 66*a*, 66*b* and 66*c* are relatively large compared to the whole video area.

It is preferable to switch the center position of the first video area 66 or the second video areas 66*a*, 66*b* and 66*c*, or to adjust the output direction of the pulsed laser, according to the optical zoom magnification. By doing so, even when the optical zoom magnification can be changed, the first video area 66 or the second video areas 66*a*, 66*b* and 66*c* can reliably correspond to the laser ranging points 63, 63*a*, 63*b* and 63*c*.

Figure 18:
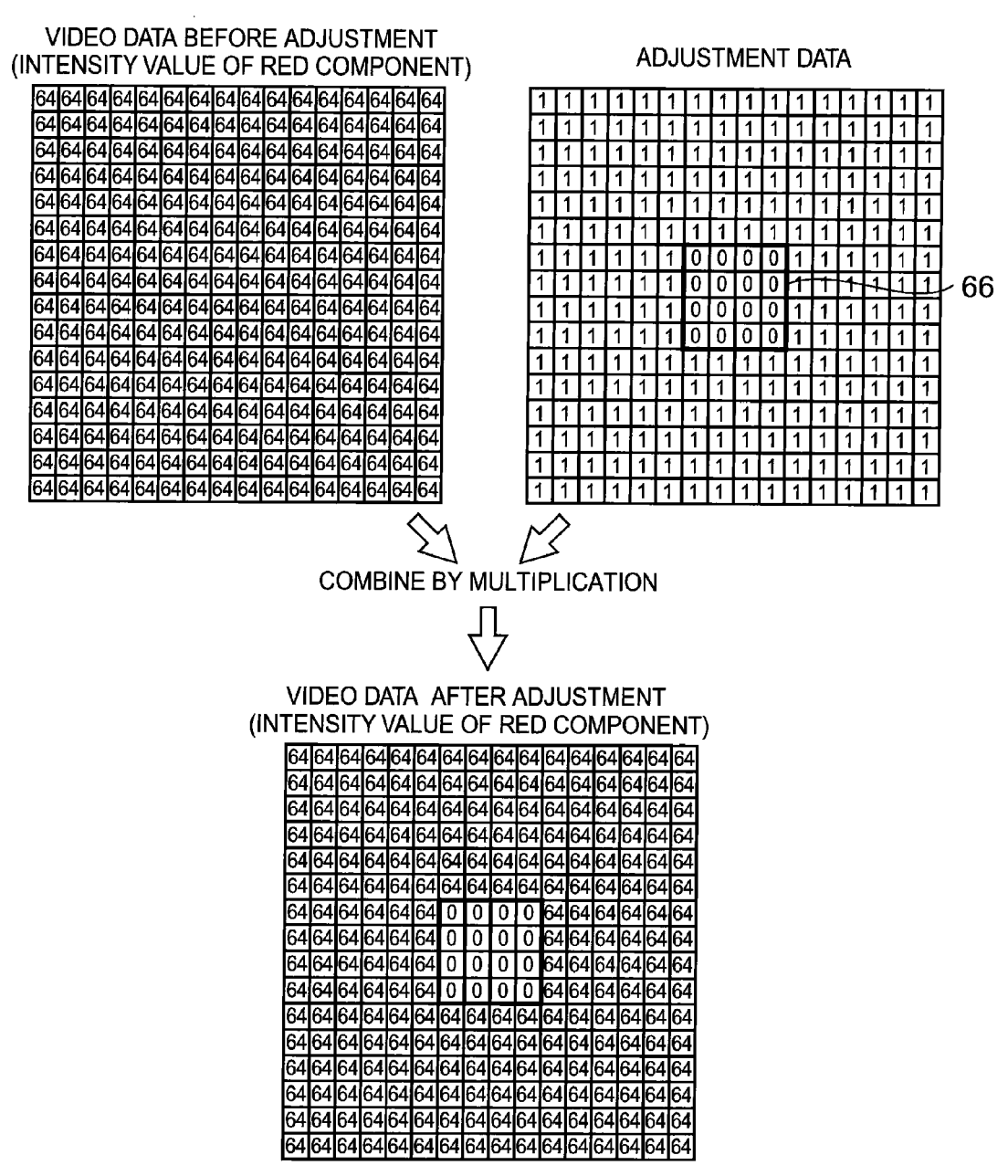
Figure 19:
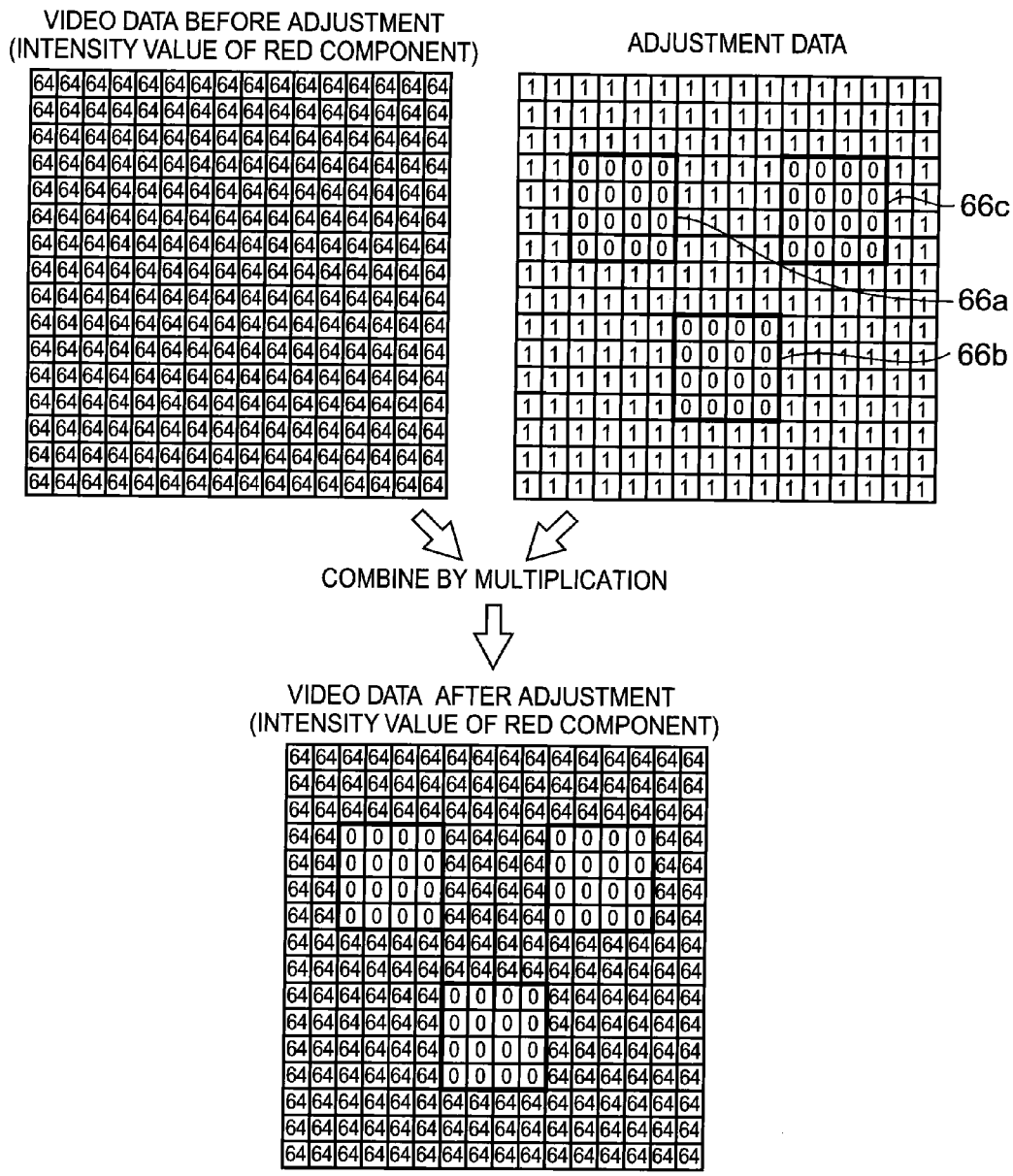
FIG. 19 is an explanatory diagram showing adjustment of video data.
Figure 21A:
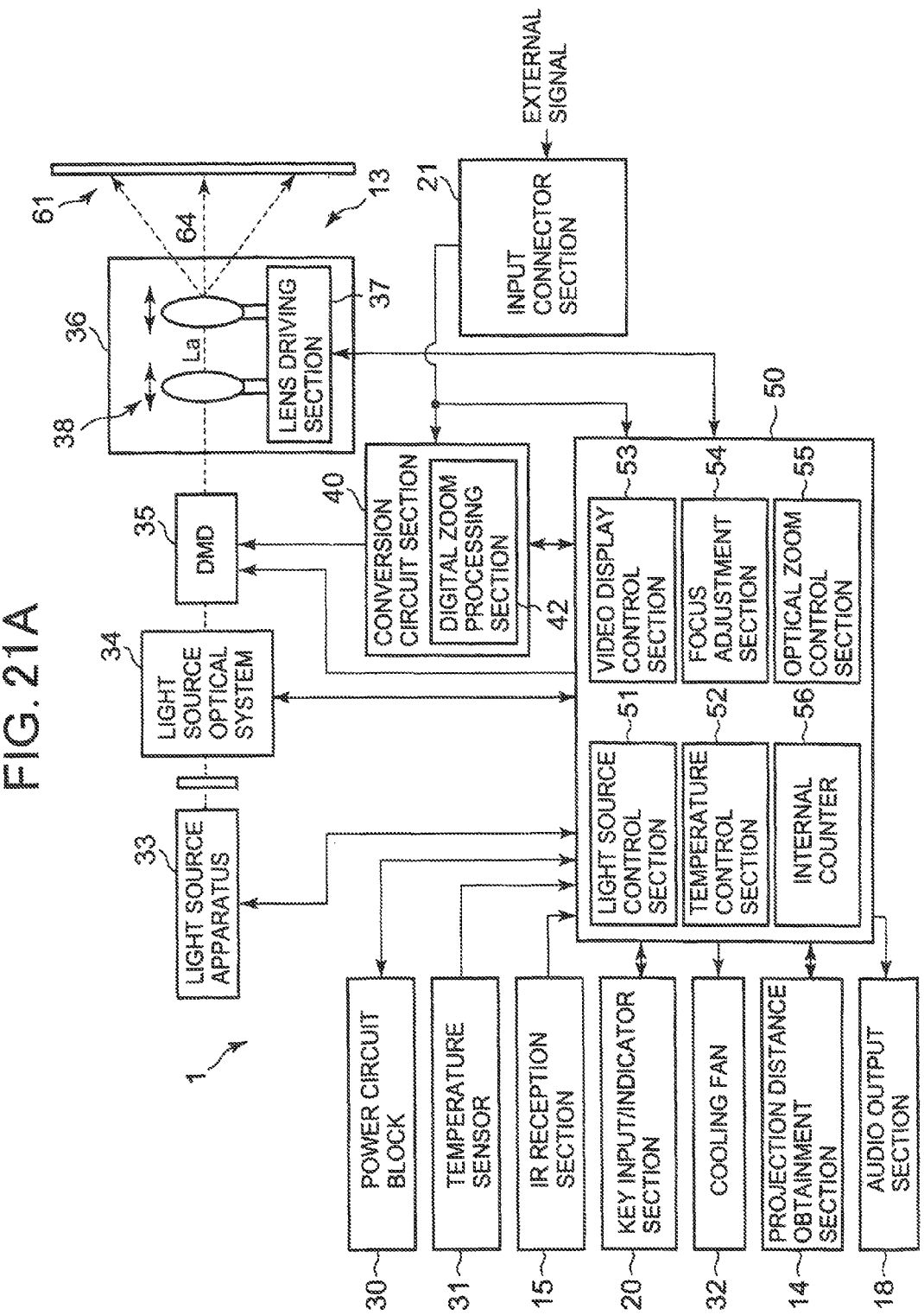
FIG. 21a is an explanatory diagram showing a projector wherein a filter is provided between a light source apparatus and a DMD.
Figure 21B:
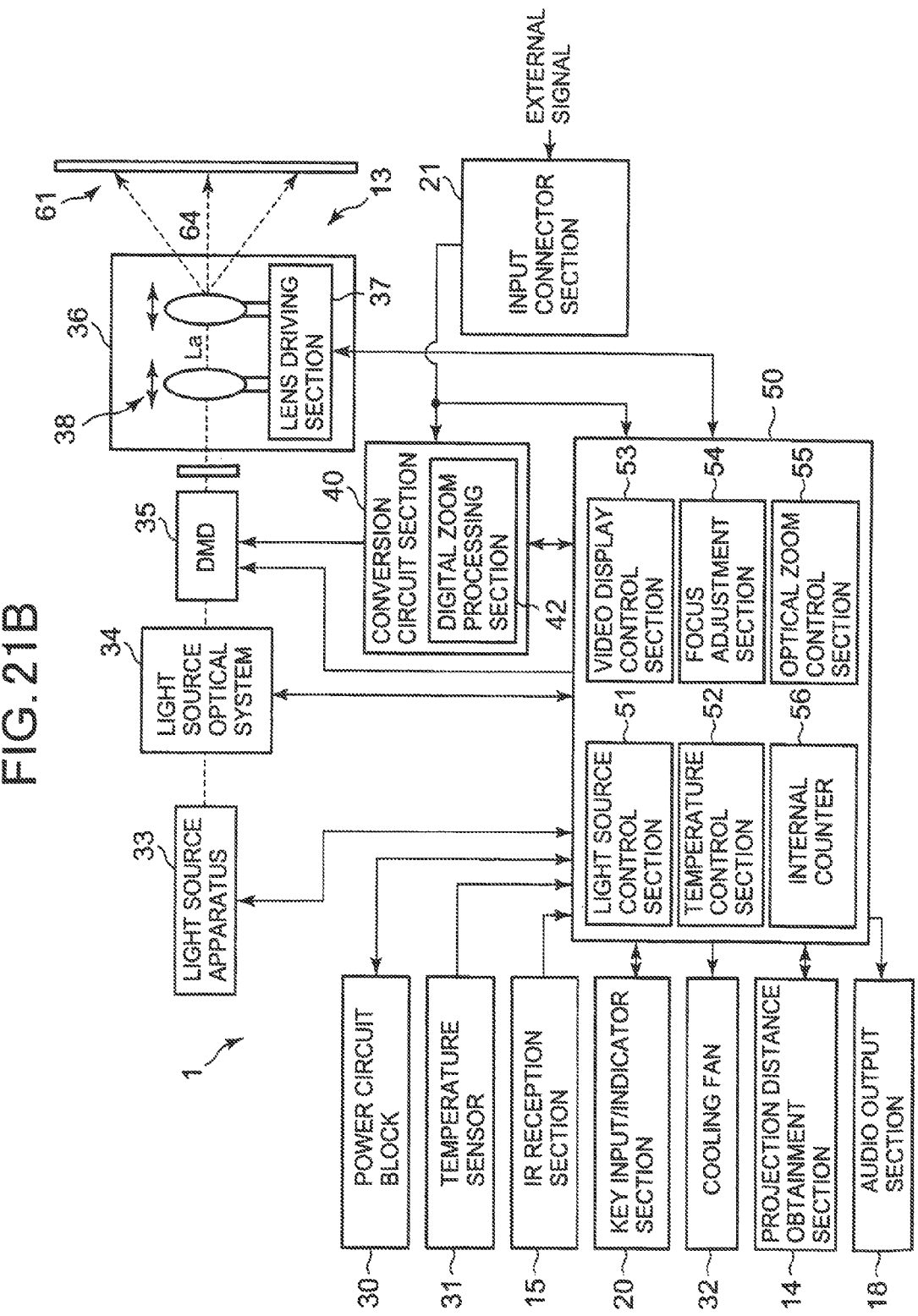
FIG. 21B is an explanatory diagram showing a projector wherein a filter is provided between the DMD and a projection optical system.

In the above-described embodiment, an example where a predetermined grayscale value is set in the first video area 66 or the second video areas 66*a*, 66*b* and 66*c* of the adjustment data and the adjustment data overwrites and is combined to the video data is described, however, for example as shown in FIG. 18 or FIG. 19, a predetermined attenuation rate may be previously set in the first video area 66 or the second video areas 66*a*, 66*b* and 66*c* of the adjustment data, and the video data and the adjustment data may be combined by multiplication.

In such a case, as shown in FIG. 20A and FIG. 20B, the attenuation rate of the first video area 66 or the second video areas 66*a*, 66*b* and 66*c* may be set to become large as close to the corresponding laser ranging points 63, 63*a*, 63*b* and 63*c*.

The first video area 66 or the second video areas 66*a*, 66*b* and 66*c* may cover the whole video area. In any case, the predetermined display color is to be attenuated at the laser ranging points 63, 63*a*, 63*b* and 63*c*.

In the above-described embodiment, an example where the inclination angle derivation for focus adjustment or distortion correction is performed periodically is described, however, the inclination angle derivation for focus adjustment or distortion correction may start according to an operation by the user through the key/indicator section 20 or the remote controller. In any case, the measuring by the laser and the video display for the measuring is to be synchronized.

In the above-described embodiment, an example where the video data of only the red component is adjusted corresponding to the peak wavelength of the pulsed laser being at the red component is described, however, similar adjustment to the video data of the other color components may be performed. In any case, the video data of the color component corresponding to the peak wavelength of the pulsed laser is to be adjusted.

In the above-described embodiment, an example where the video data of the video areas (first video area 66 or the second video areas 66*a*, 66*b* and 66*c*) corresponding to the laser ranging points 63, 63*a*, 63*b* and 63*c* is adjusted so that the intensity value of the color component corresponding to the peak wavelength range of the pulsed laser is attenuated is described, however, the video data may be adjusted so that the display status of the whole projection plane 61 becomes black.

In the above-described embodiment, a structure where the predetermined display color is attenuated in the video areas (first video area 66 or the second video areas 66*a*, 66*b* and 66*c*) corresponding to the laser ranging points 63, 63*a*, 63*b* and 63*c* by adjusting the video data is described, however, a physical optical filter may intervene between the halogen lamp and the DMD 35 or the DMD 35 and the projection optical system 36 synchronizing with the timing of the laser ranging so that the predetermined display color of the first video area 66 or the second video areas 66*a*, 66*b* and 66*c* attenuate. In other words, the physical optical filter may intervene on a light path of the projected video to the projection plane 61 where the light path (laser path) of the pulsed laser is not interfered.

In the above-described embodiment, a structure where the control section 50 and the conversion circuit section 40 are separate is described, however, the conversion circuit section 40 may be configured as a part of the control section 50.

In the above-described embodiment, an example where DMD 35 is applied as the display element is described, however other display elements such as a liquid crystal panel may be applied as the display element.

In the above-described embodiment, an example where a laser is used as light for obtaining the projection distance is described, however, the present invention is not limited to the embodiment shown.

The light for obtaining the projection distance may be a laser output from a semiconductor, light output from an LED, modulated light output from an LED, etc., or any other light which is output to a projection plane to measure a distance to a projection plane by receiving the reflected light from the projection plane.

The entire disclosure of Japanese Patent Application No. 2007-237501 on Sep. 13, 2007 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A projection apparatus comprising:
   a video display control section to project and display a video according to input video data; and
   a projection distance obtainment section to irradiate a projection plane with light where the video is projected and displayed by the video display control section, and to obtain a projection distance to the projection plane,
   wherein when the projection distance is obtained by the projection distance obtainment section, the video display control section adjusts a display status of a predetermined video area corresponding to an area irradiated with the light so that at least an intensity value of a color component corresponding to a peak wavelength of the light attenuates.

2. The projection apparatus according to claim 1, wherein the video display control section adjusts a display status of a whole video projected and displayed on the projection plane to black.

3. The projection apparatus according to claim 1, wherein the video display control section adjusts the predetermined video area so that an attenuation rate of the predetermined video area is larger than that of a video area other than the predetermined video area.

4. The projection apparatus according to claim 1, further comprising a zoom control section to optically zoom a size of the video projected and displayed by the video display control section, wherein the video display control section switches the predetermined video area according to a zoom state controlled by the zoom control section.

5. The projection apparatus according to claim 1, wherein the video display control section controls a position of a predetermined filter on a light path of the projected video to the projection plane without interfering with a light path of the light.

6. The projection apparatus according to claim 1, further comprising a distortion correction section to correct distortion of an image of the projected video formed on the projection plane according to the projection distance obtained by the projection distance obtainment section.

7. The projection apparatus according to claim 6, wherein:
   the projection distance obtainment section emits the light in at least three directions and obtains projection distances to the projected plane in the respective directions; and
   the distortion correction section corrects a distortion of the image of the projected video formed on the projection plane according to the projection distances in the respective directions obtained by the projection distance obtainment section.

8. The projection apparatus according to claim 1, further comprising a focus adjustment section to adjust focus of an image of the projected video formed on the projection plane according to the projection distance obtained by the projection distance obtainment section.

9. The projection apparatus according to claim 1, wherein the light comprises a laser.

10. An optical ranging method comprising:
    a video display controlling step to project and display a video according to input video data; and
    a projection distance obtaining step to irradiate a projection plane with light where the video is projected and displayed by the video display controlling step, and to obtain a projection distance to the projection plane,
    wherein when the projection distance is obtained in the projection distance obtaining step, the video display controlling step includes adjusting a display status of a predetermined video area corresponding to an area irradiated with the light so that at least an intensity value of a color component corresponding to a peak wavelength of the light attenuates.

11. The optical ranging method according to claim 10, wherein the light comprises a laser.

* * * * *